Sept. 25, 1928.
F. KEMPTER
KNEADING MACHINE
Filed May 21, 1926
1,685,637
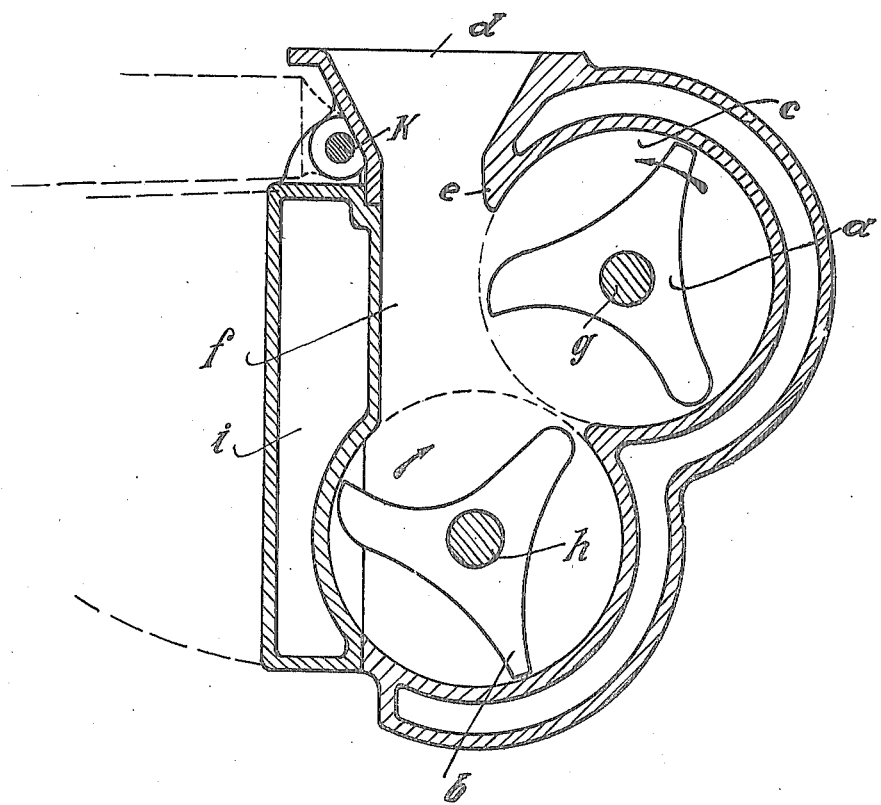
Inventor:
Fritz Kempter
by Kenshaw
Atty.

Patented Sept. 25, 1928.

1,685,637

UNITED STATES PATENT OFFICE.

FRITZ KEMPTER, OF STUTTGART, GERMANY.

KNEADING MACHINE.

Application filed May 21, 1926, Serial No. 110,715, and in Germany June 25, 1925.

My invention relates to kneading machines and more particularly to machines treating resiliently plastic materials, for instance rubber. It is an object of my invention to provide a machine in which the tendency of the material is overcome to accumulate at the point where the kneading arms move toward the inner end of the charging hopper.

To this end I provide a downwardly extending partition in connection with the inner end of the charging hopper, said partition extending to a point between the highest point of the path of said kneading arms and their axis of rotation, preferably where the tangent to the circle described by the kneading arms extends at a comparatively steep angle to the horizontal and therefore the kneading arms have no tendency to force the material back toward the charging hopper, but on the contrary tend to pull it out of the hopper in downward direction.

In the preferred embodiment of my invention I provide two superimposed kneaders and I so arrange their axes that the line which connects their axes is substantially parallel to the tangent at the end of the partition.

In the kneading machines for resiliently plastic materials as heretofore designed the arrangement of parts is substantially the same as in kneading machines for working dough and other plastic, but not resilient substances. Where such machines are applied to the treatment of resiliently plastic substances, it has been found that the substances tend to rise toward the charging hopper of the machine where they are beyond reach of the kneading action so that the output of the machine is much reduced. I have found that in providing a partition as described the output of the machine is greatly increased.

In the drawings affixed to this specification and forming part thereof a kneading machine embodying my invention is illustrated diagrammatically by way of example in vertical section.

Referring to the drawings, $a$ and $b$ are kneaders supported in the trough $f$. The kneaders are mounted on superposed shafts $g$ and $h$ and rotate in opposite directions, as indicated by the arrows. $i$ is the front wall of the trough which is pivoted to its charging hopper $d$ at $k$ and can be swung upwards as shown in dotted lines.

A partition $e$ extends downwardly from the inner end of the hopper $d$ to a point intermediate the highest point of the path of the kneading arms and the axis of the shaft $g$, said portion extending at the end of the hollow cylinder $c$ in which the kneader $a$ rotates. In the example illustrated the radius from the shaft $g$ to the end of the partition $e$ extends at an angle of about 30° to the horizontal, and therefore the tangent at this point extends at an angle of about 60° to the horizontal.

The rotating arms of the upper kneader $a$ tend to pull the material away from the discharge hopper and to force it downwardly toward the lower kneader $b$, which is arranged below the first kneader, and preferably spaced from it in such manner that the line connecting the axes of the two shafts extends in parallel to the tangent at the end of the partition $e$. In consequence of this arrangement the upwardly moving arms of the kneader $b$ are unable to push the material back toward the hopper $d$ but force it into the path of the downwardly moving arms of the kneader $a$.

I wish it to be understood that I do not desire to be limited to the exact details of construction shown and described, for obvious modifications will occur to a person skilled in the art.

I claim:—

Kneading machine comprising a trough, a kneader mounted for rotation in said trough, a charging hopper adapted to supply material to said kneader, a partition extending from the inner end of said hopper to a point intermediate between the highest point attained by said kneader and its axis of rotation, and a second kneader so arranged below said kneader that the line connecting the axes of both kneaders extends substantially in parallel to the tangent at the end of said partition.

In testimony whereof I affix my signature

FRITZ KEMPTER.